US009924324B1

(12) United States Patent
Nelson

(10) Patent No.: US 9,924,324 B1
(45) Date of Patent: Mar. 20, 2018

(54) LOCATING MULTIPLE HANDHELD DEVICES

(71) Applicant: International Business Machines Corporation, Armonk, NY (US)

(72) Inventor: David T. Nelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/362,755

(22) Filed: Nov. 28, 2016

(51) Int. Cl.
*H04W 24/00* (2009.01)
*H04W 4/02* (2018.01)
*H04L 12/841* (2013.01)
*H04L 29/06* (2006.01)

(52) U.S. Cl.
CPC ............. *H04W 4/025* (2013.01); *H04L 47/28* (2013.01); *H04L 65/601* (2013.01); *H04W 4/02* (2013.01)

(58) Field of Classification Search
CPC ..... H04L 65/601; G06Q 30/03; H04W 8/245; H04W 4/02; H04M 1/72519
USPC ................... 455/456.3, 418, 550.1; 709/219; 705/14.71
See application file for complete search history.

(56) References Cited

U.S. PATENT DOCUMENTS

| 4,762,990 | A | 8/1988 | Caswell et al. | |
| 7,006,881 | B1 * | 2/2006 | Hoffberg | G05B 15/02 700/17 |
| 7,452,307 | B2 * | 11/2008 | Chuang | A63B 21/22 482/44 |
| 8,312,660 | B1 * | 11/2012 | Fujisaki | F41A 17/08 42/70.01 |
| 8,761,523 | B2 * | 6/2014 | Cok | G06K 9/00677 382/224 |
| 8,909,299 | B2 | 12/2014 | Merciri et al. | |
| 2007/0061735 | A1 * | 3/2007 | Hoffberg | G06F 9/4443 715/744 |
| 2010/0328447 | A1 | 12/2010 | Watson | |
| 2012/0036016 | A1 * | 2/2012 | Hoffberg | G05B 15/02 705/14.58 |
| 2012/0233000 | A1 * | 9/2012 | Fisher | G06Q 30/02 705/14.71 |
| 2013/0265450 | A1 * | 10/2013 | Barnes, Jr. | H04N 5/77 348/207.1 |

(Continued)

FOREIGN PATENT DOCUMENTS

WO     2014172656     10/2014

OTHER PUBLICATIONS

Lee-Delisle, "PixelPhones—a huge display made with smartphones," Sep. 17, 2011, 13 pages.

(Continued)

*Primary Examiner* — Danh Le
(74) *Attorney, Agent, or Firm* — VanLeeuwen & VanLeeuwen; Tihon Poltavets

(57) ABSTRACT

An approach is disclosed that receives, from a number of mobile devices, time data with the timing data is based on an elapsed time from a timing signal and line-of-sight events directed to the mobile devices. A location of each of the mobile devices is determined based on the respective timing data received from each of the mobile devices. A portion of an overall image to display at each of the mobile devices is determined based on the identified location of the mobile devices, and the overall image is displayed by transmitting the determined portion to each of the plurality of mobile devices.

17 Claims, 9 Drawing Sheets

(56) References Cited

U.S. PATENT DOCUMENTS

| | | |
|---|---|---|
| 2014/0009366 A1 | 1/2014 | Chang |
| 2014/0193037 A1 | 7/2014 | Stitzinger et al. |
| 2014/0334669 A1 | 11/2014 | Acharya |
| 2014/0337477 A1* | 11/2014 | Fisher .................. H04L 65/601 709/219 |

OTHER PUBLICATIONS

Schwarz et al., "Phone as a Pixel: Enabling Ad-Hoc, Large-Scale Displays Using Mobile Devices," CHI 2012, May 2012, Austin, Texas, pp. 2235-2238.

* cited by examiner

Radians – Vertical Sweep (e.g. from below controller to back of arena)
Arena Floor Example – Overhead View
(e.g., users at same elevation)

LOCATING MULTIPLE HANDHELD DEVICES

BACKGROUND

In order to organize visual input or output from a large group of individual mobile phones, tablets, or other handheld computing devices, each containing a display, and each individual device position is determined within the visual space. As an example, in an auditorium where it is intended to create a large display composed of individual attendees devices, the position of each device, or "pixel" in the overall auditorium wide display must be known.

SUMMARY

An approach is disclosed that receives, from a number of mobile devices, time data with the timing data is based on an elapsed time from a timing signal and line-of-sight events directed to the mobile devices. A location of each of the mobile devices is determined based on the respective timing data received from each of the mobile devices. A portion of an overall image to display at each of the mobile devices is determined based on the identified location of the mobile devices, and the overall image is displayed by transmitting the determined portion to each of the plurality of mobile devices.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
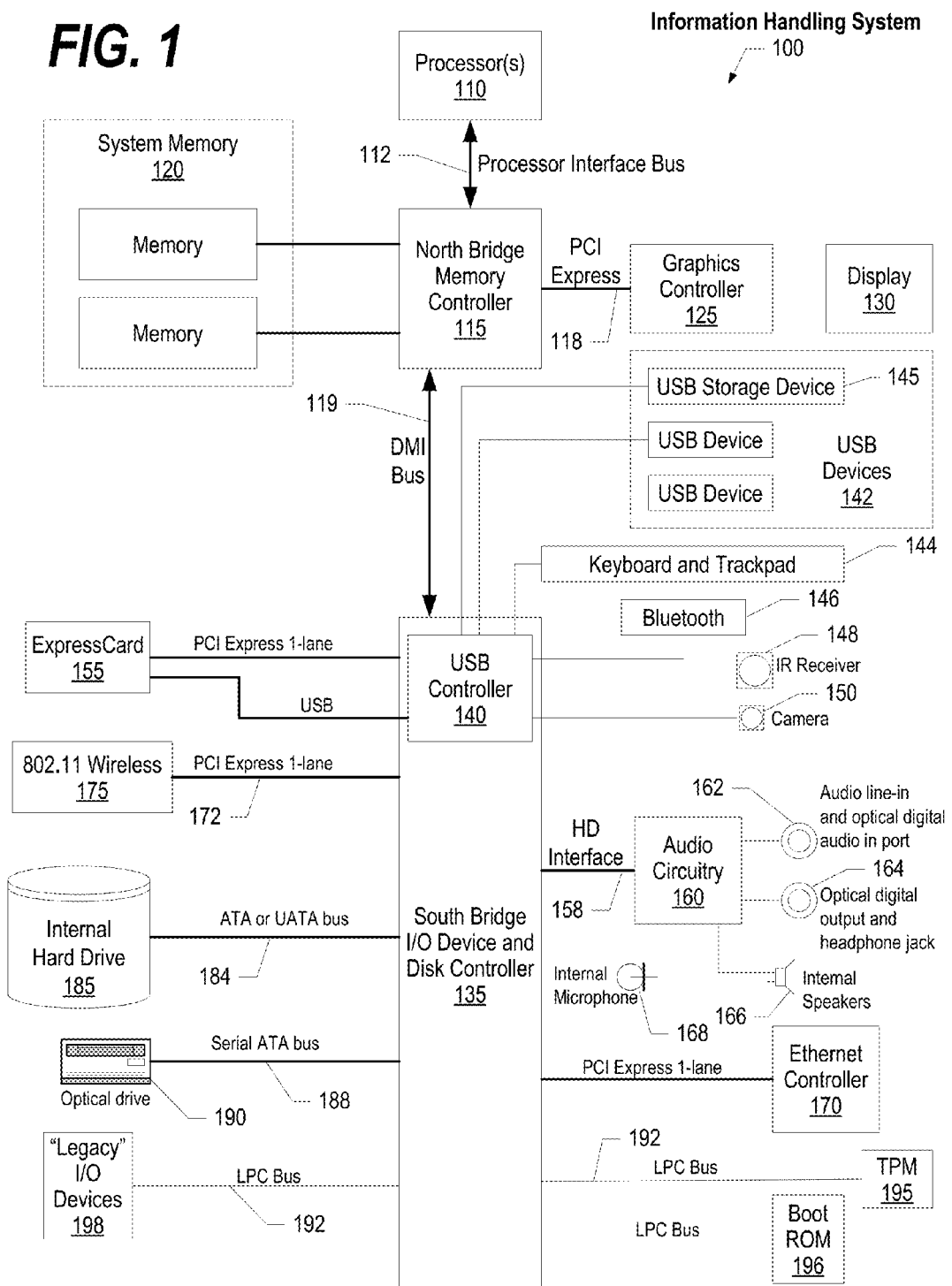
FIG. 1 is a block diagram of a data processing system in which the methods described herein can be implemented.

FIGS. 1-9 show an approach that receives, from a number of mobile devices, time data with the timing data based on an elapsed time from a timing signal and line-of-sight events directed to the mobile devices. A location of each of the mobile devices is determined based on the respective timing data received from each of the mobile devices. A portion of an overall image to display at each of the mobile devices is determined based on the identified location of the mobile devices, and the overall image is displayed by transmitting the determined portion to each of the plurality of mobile devices.

In one embodiment, the timing signal is simultaneously transmitted to the mobile devices and a number of line-of-sight sweeps are emitted across an area where the mobile devices are located. In this embodiment, each of the line-of-sight sweeps are directed using a different angular motion. In a further embodiment, a first of the line-of-sight sweeps is a horizontal sweep from a controller that is used to identify a Cartesian coordinate value corresponding to each of the mobile devices, and a second line-of-sight sweeps is a radial sweep from the controller that is used to identify a radian (polar) coordinate value from the controller to each of the devices. The location of each of the devices is based on the Cartesian coordinate value and the polar coordinate value.

In one embodiment, the approach records a time period between the transmission of the timing signal and angles that comprise the angular motions traversed during the line-of-sight sweeps. In this embodiment, the location of each of the plurality of mobile devices is determined based on the angles that correspond to the recorded time periods that match the received timing data received from the mobile devices.

In one embodiment, the approach maps the locations of the mobile devices onto an area. The approach then overlays the overall image onto the area and determines the portion of the overall image to display at each of the mobile devices based on the overlaid image with respect to location of each of the mobile devices.

In an embodiment that provides motion to the overall image, the approach transmits a number of portions to each of the mobile devices, so that when the portions are successively displayed on the mobile devices a motion-based image appears. In a further embodiment, timing data can be included to indicate how long each of the transmitted portions is to be displayed on the mobile devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
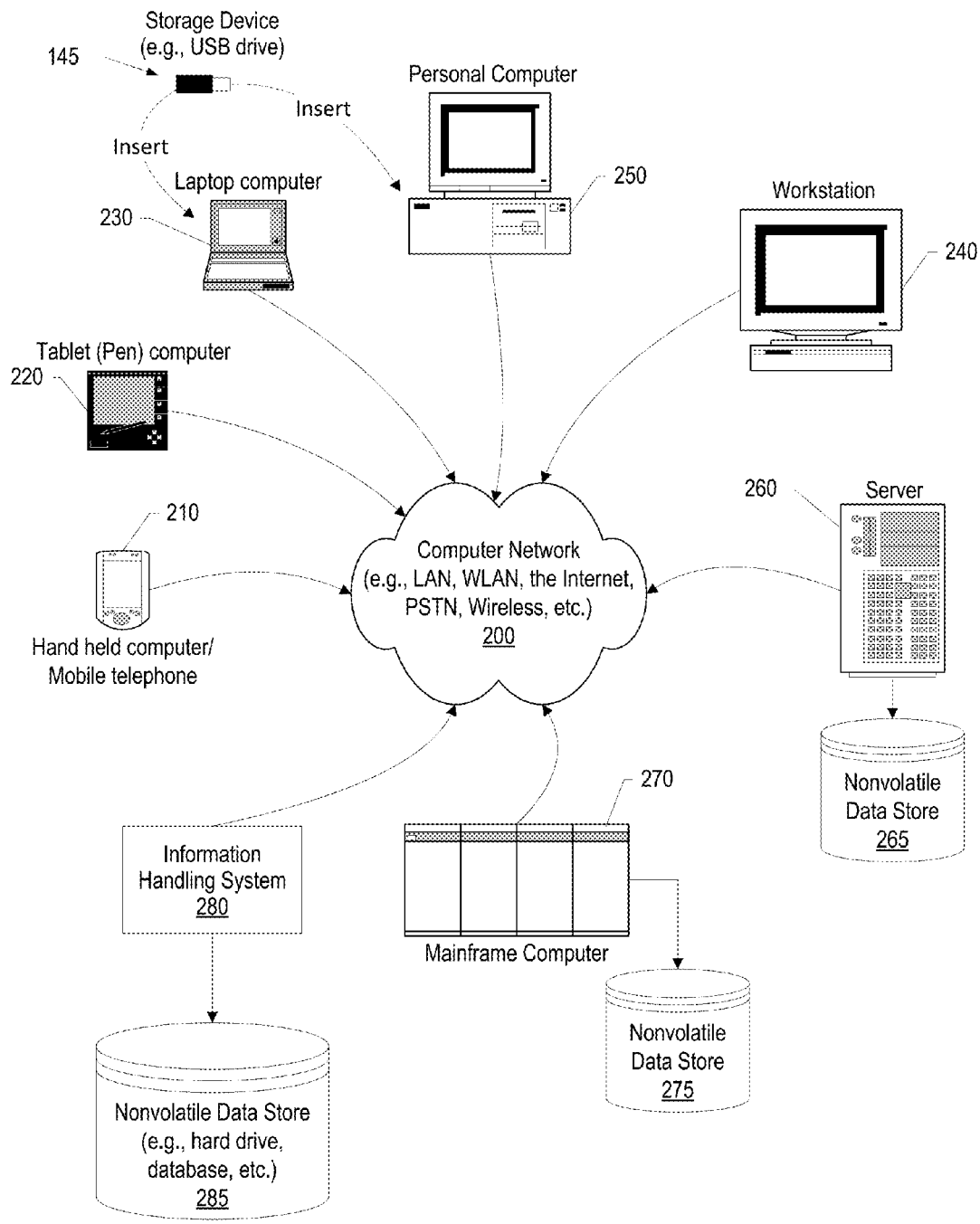
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3A:
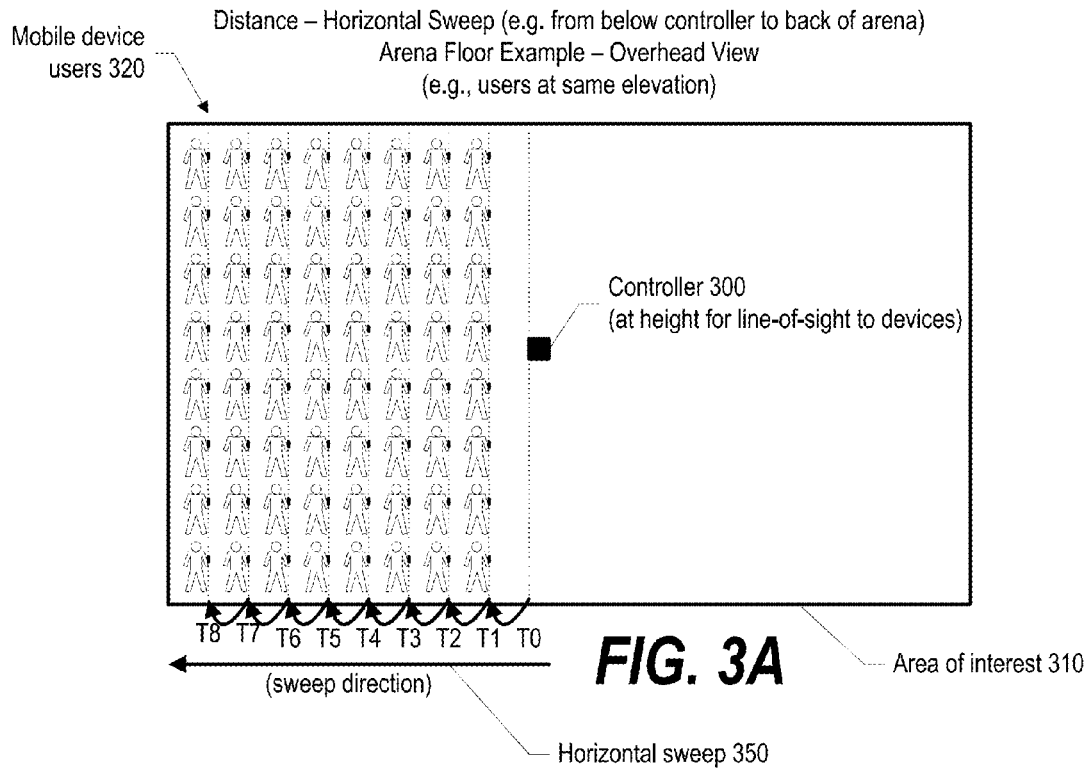
FIG. 3A is a component diagram depicting a top view of a horizontal sweep to capture timing data at mobile devices.
Figure 3B:
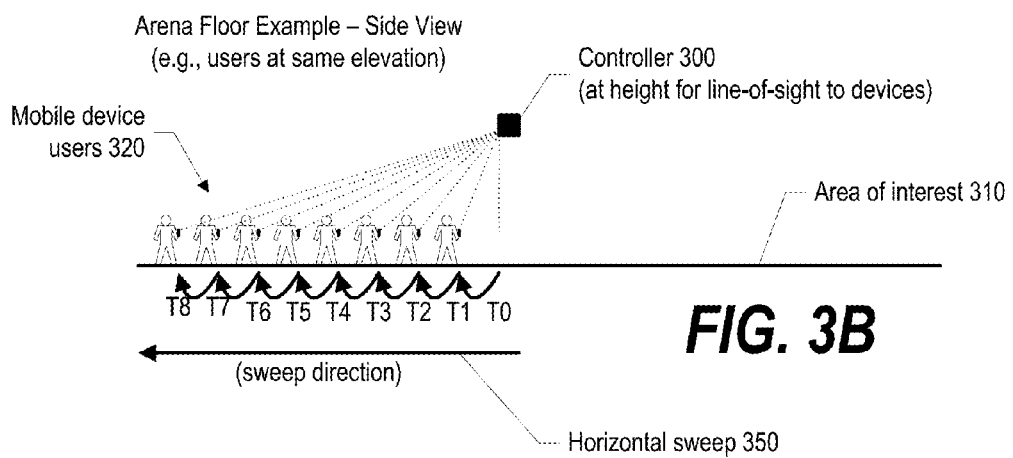
FIG. 3B is a component diagram depicting a side view of a horizontal sweep to capture timing data at mobile devices.
Figure 4:
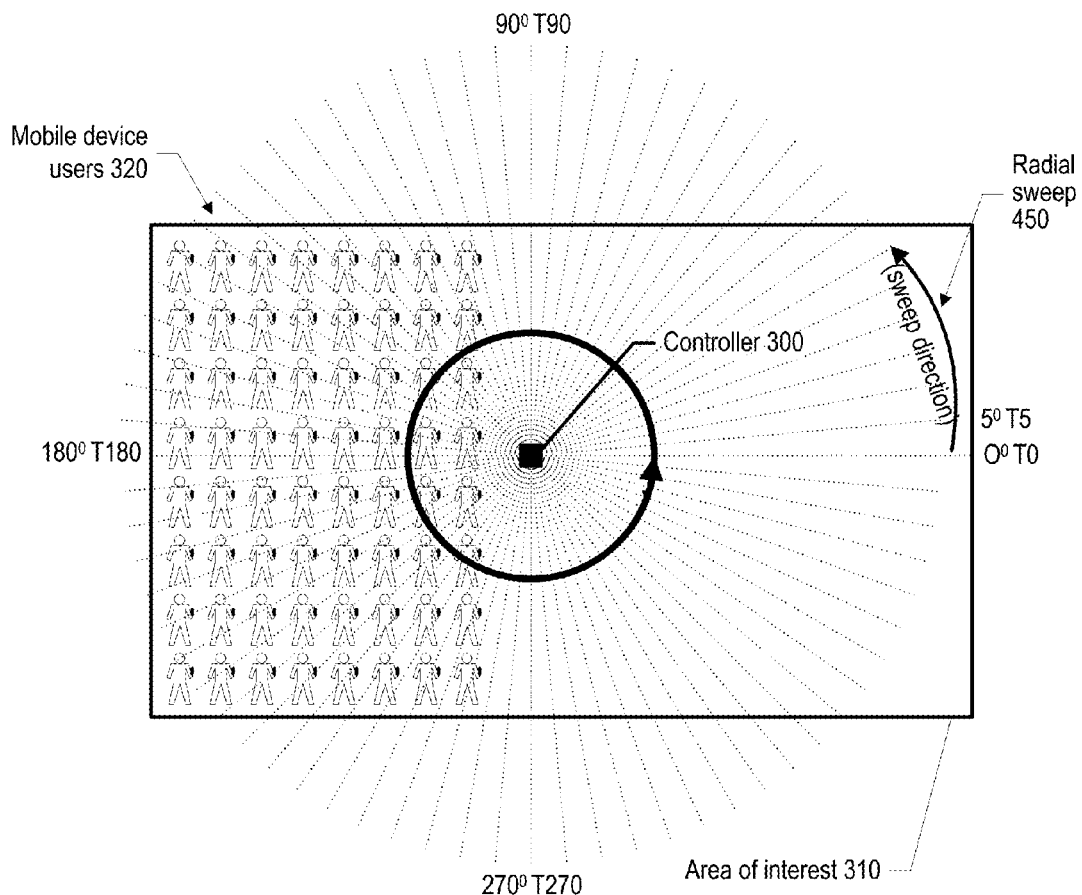
FIG. 4 is a component diagram depicting a top view of a radial sweep to capture timing data at mobile devices.

FIG. 3A is a component diagram depicting a top view of a horizontal sweep to capture timing data at mobile devices. Controller 300 is a device that emits sweep signals in a number of directions, such as horizontally as shown in FIGS. 3A and 3B as well as in a radial direction as shown in FIG. 4. In FIG. 3A, area of interest is depicted as an area where a number of mobile device users are congregating, such as in an arena or in an audience area. FIG. 3A depicts a top, or overhead, view of the area with horizontal sweep 350 being depicted as starting below the overhead controller and sweeping out horizontally away from the controller. As the sweep progresses, the angle between the controller and the sweep mechanism changes with this angle being used to determine a coordinate value of each of the mobile devices using a Cartesian coordinate system (e.g., x or y coordinates from the controller, etc.).

FIG. 3B is a component diagram depicting a side view of a horizontal sweep to capture timing data at mobile devices.

FIG. 3B depicts the same area of interest 310 and same mobile device users 320 but shown from a side view. Here, controller 300 can be seen sweeping away from the controller with different angles being created by the different sweeps. As described in FIG. 3A, these angles are used to determine a coordinate of the mobile devices so that the location of each of the mobile devices 320 can be ascertained with respect to controller 300. As will be explained in further detail below, the controller sends out a timing signal that is received from all mobile devices simultaneously, such as a light flash, and then keeps track of the angle created by the controller during the sweep in the horizontal motion. The mobile devices record the amount of time it took to receive the sweep signal, such as a light strobe, and transmit this data back to the controller along with the identifier corresponding to each of the mobile devices. With the timing information, the controller can determine the angle of the sweep at the time that each of the mobile devices received the sweep signal. Using this angle information, the controller can determine one coordinate (a grid or Cartesian coordinate) from the controller to each of the mobile devices.

FIG. 4 is a component diagram depicting a top view of a radial sweep to capture timing data at mobile devices. Here, controller 300 performs a series of radial sweeps across area 310 so that a radial, or polar, coordinate of each of mobile devices 350 can be ascertained. Here, controller 300 sweeps in a radial motion (e.g., starting at zero degrees (0°) out from the controller and sweeping counter-clockwise in a complete circle (360°), etc.). The mobile devices record the amount of time it took to receive the radial sweep signal, such as a light strobe, and transmit this data back to the controller along with the identifier corresponding to each of the mobile devices. With the timing information, the controller can determine the angle of the sweep at the time that each of the mobile devices received the sweep signal. Using this angle information, the controller can determine another coordinate (a radial or polar coordinate) from the controller to each of the mobile devices. After receiving a Cartesian coordinate from processing shown in FIGS. 3A and 3B, and a polar coordinate from processing shown in FIG. 4, the approach can identify a location of each of the mobile devices.

Figure 5:
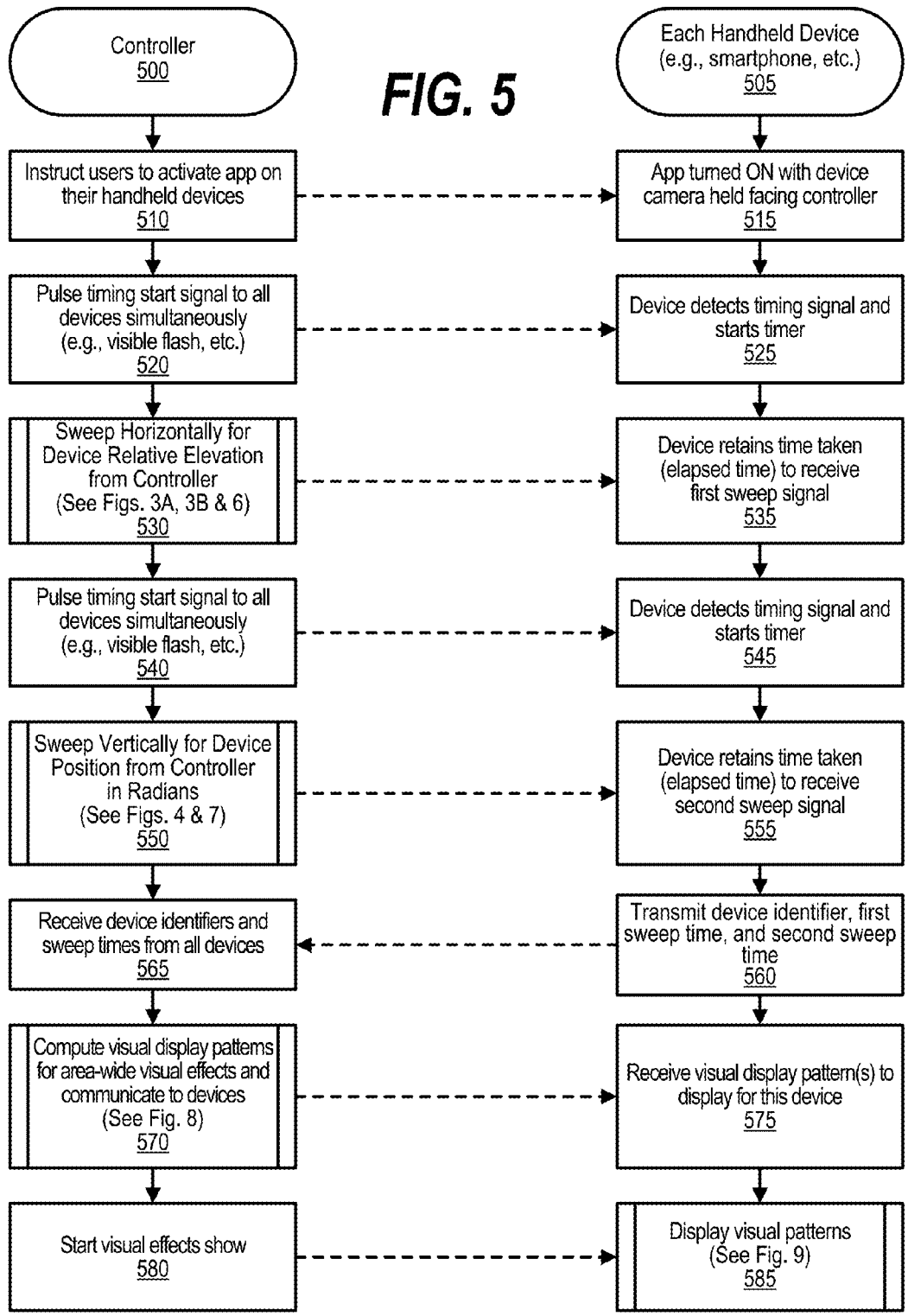
FIG. 5 is a flowchart depicting high level communications between a controller and a number of handheld devices to identify location data pertaining to each of the handheld devices.

FIG. 5 is a flowchart depicting high level communications between a controller and a number of handheld devices to identify location data pertaining to each of the handheld devices. FIG. 5 processing commences at 500 and 505 and shows the steps taken by a controller and at each mobile device, respectively. At step 510, the controller process instructs the mobile device users to activate an app installed on their handheld devices to display a group generated visual display. At step 515, the mobile device users turns the apps ON with the device signal receivers, such as digital cameras, held facing the controller, thus starting the mobile device process.

At step 520, the controller process transmits a pulse timing start signal to all of the mobile devices simultaneously. The timing signal can be a visible flash, invisible signal, such as a WiFi signal, etc. that is broadcast to all of the mobile devices simultaneously. At step 525, the mobile device process detects the timing signal transmitted from the controller and starts a timer at the mobile device. The timer is used to determine how much time elapses before the mobile device receives various sweep signals from the controller.

Figure 6:
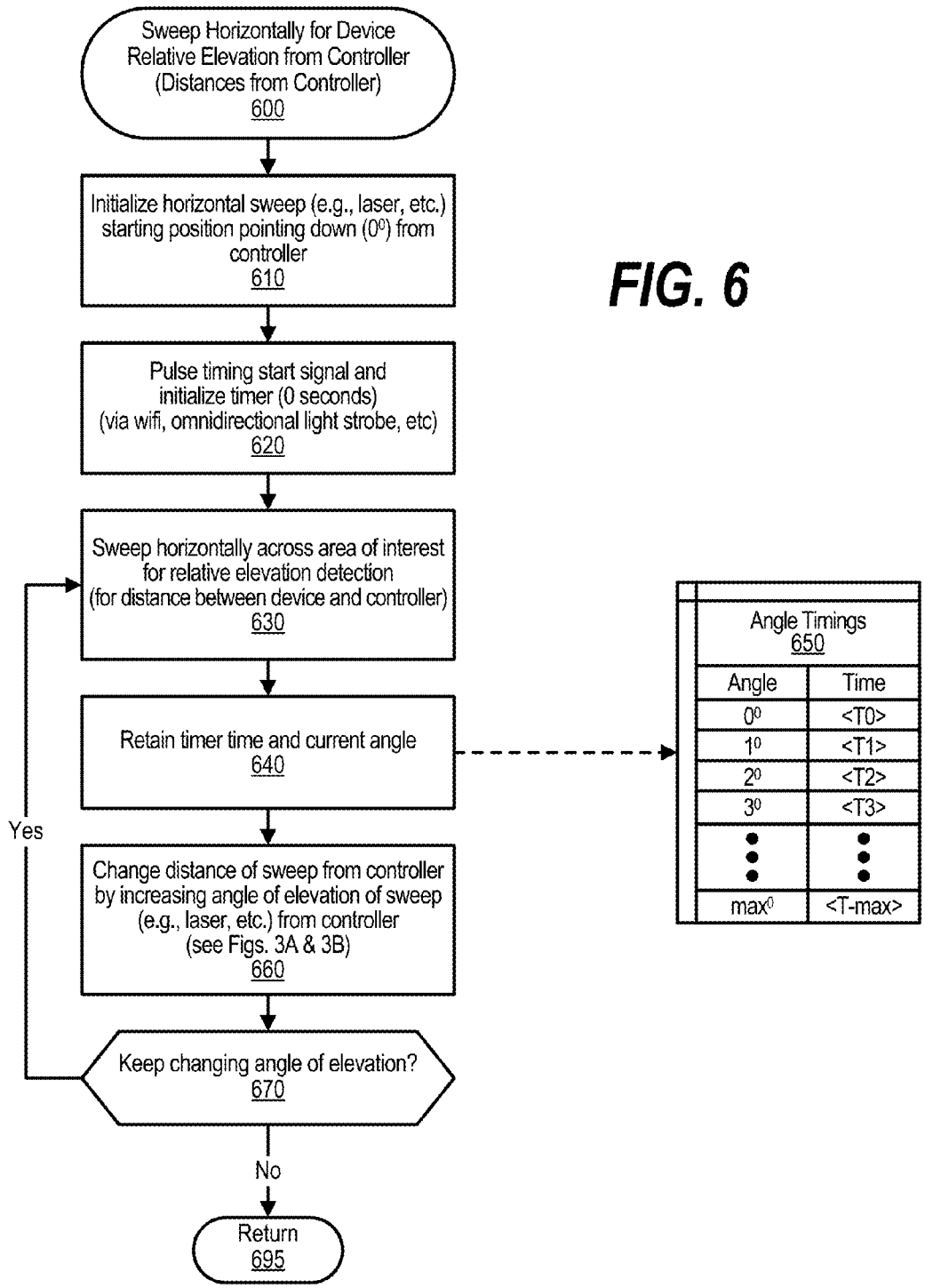
FIG. 6 is a flowchart depicting steps taken during a horizontal sweep of an area.

At predefined process 530, the controller process performs the first sweep routine, such as a horizontal sweep, that identifies a first coordinate of the mobile devices from the controller, such as in a grid, or Cartesian, coordinate system (see FIGS. 3A, 3B, and 6 and corresponding text for processing details). At step 535, the mobile device process detects the sweep signal from the controller and retains the amount of time taken (elapsed time) to receive first sweep signal.

At step 540, the controller process transmits a second timing start signal to all devices simultaneously as per step 520. In one embodiment, this step is avoided by simply using the first timing signal from step 520 and basing all sweep signal times off of the first timing signal. At step 545, if a second timing signal is being used, the mobile device process detects the second timing signal and starts the timer.

Figure 7:
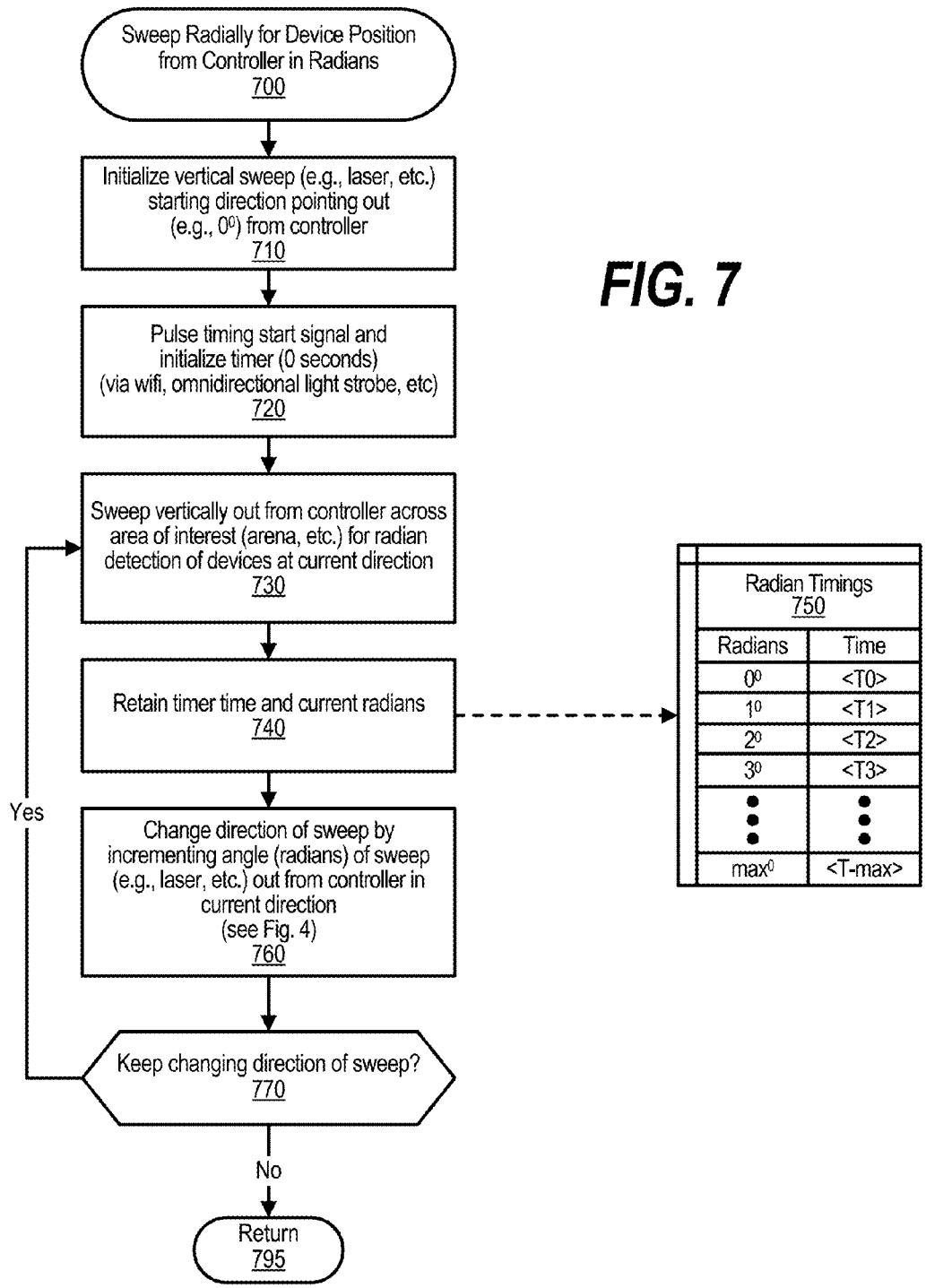
FIG. 7 is a flowchart depicting steps taken during a radial sweep of an area.

At predefined process 550, the controller process performs the vertical sweep routine that identifies locations of the mobile devices from the controller in radians, or in a polar coordinate system (see FIGS. 4 and 7 and corresponding text for processing details). At step 555, the mobile device process detects the vertical sweep signal from the controller and retains the amount of time taken (elapsed time) to receive the second sweep signal.

At step 560, the mobile device process transmits the device's identifier, the first sweep time, and the second sweep time back to the controller. At step 565, the controller process receives the device identifiers and the sweep times from all of the mobile devices.

Figure 8:
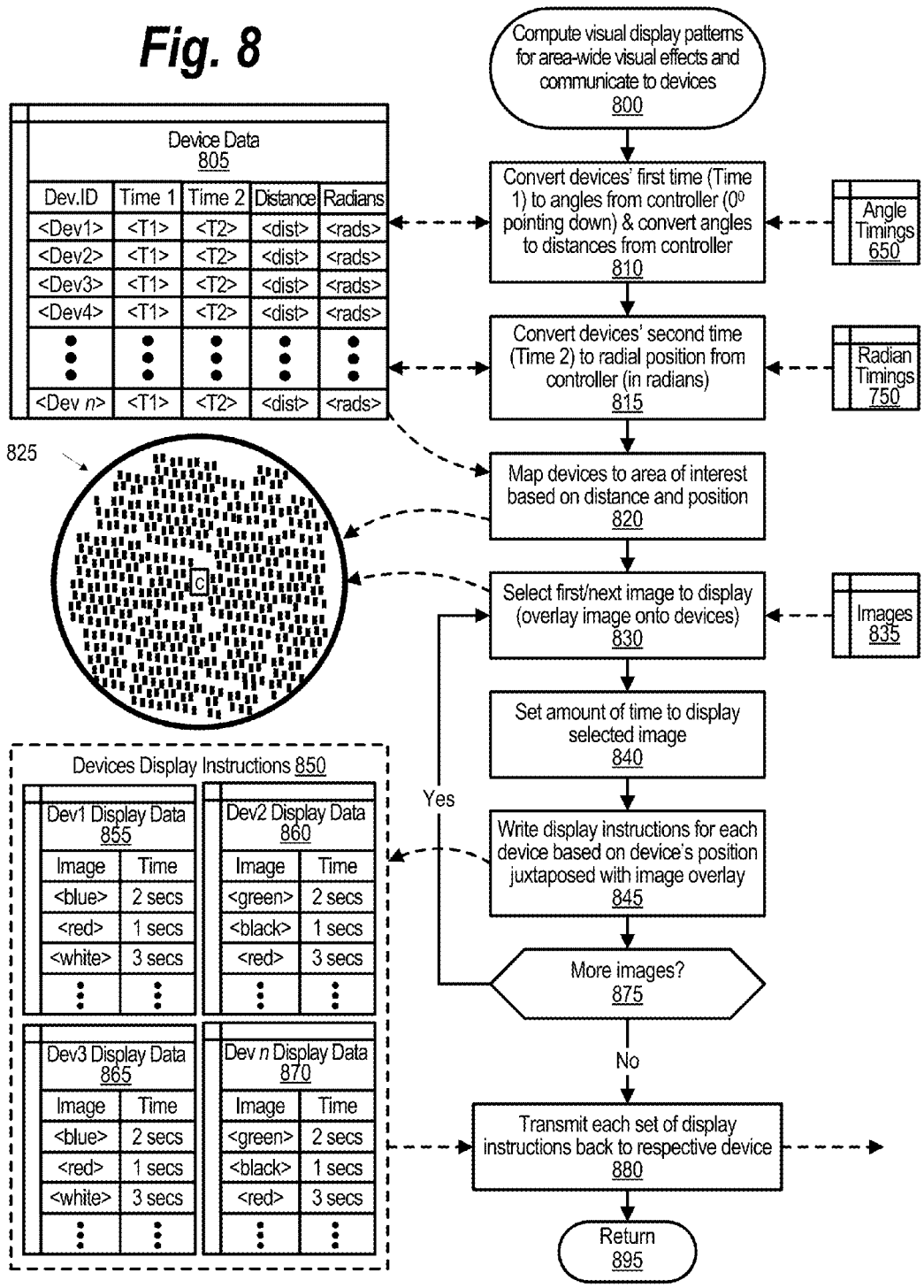
FIG. 8 is a flowchart depicting steps taken to compute visual display patterns for area-wide visual effects and communicate display data to handheld devices.

At predefined process 570, the controller process performs the compute visual display pattern routine that displays area-wide visual displays on mobile devices by communicating visual display data to the individual mobile devices (see FIG. 8 and corresponding text for processing details). At step 575, the mobile device process receives the visual display pattern, or patterns, sent from the controller that are to be displayed on this mobile device.

At step 580, the controller process starts visual effects show, such as by transmitting a start signal to the devices or the show can commence based on a start time transmitted to the mobile devices from the controller. At predefined process 585, the mobile device process performs the display visual patterns routine (see FIG. 9 and corresponding text for processing details).

FIG. 6 is a flowchart depicting steps taken during a horizontal sweep of an area. FIG. 6 processing commences at 600 and shows the steps taken by a process that sweeps horizontally for mobile device relative elevations from the controller. By sweeping horizontally, this routine identifies a grid, or Cartesian, coordinate of the mobile device with respect to the controller. At step 610, the process initializes the horizontal sweep using a sweep mechanism detectable by the mobile devices, such as a laser, etc. The starting position is established at an initial direction, such as pointing down (zero degrees) from the controller. At step 620, as also explained in FIG. 5, the controller process pulses a timing start signal and also initializes a timer in the controller.

At step 630, the controller process sweeps horizontally across the area of interest, such as an arena or stadium, to provide a relative elevation detection between the mobile devices and the controller. At step 640, the controller process retains timer time and current angle in table 650. This table is repeatedly updated so that an angle can be determined by searching the table for the elapsed time data that is provided back to the controller from a mobile device. For example, if a mobile device reports back that it received the sweep signal after one and a half seconds, the controller would search table 650 for the angle corresponding to this time measurement, such as 31 degrees, so the controller would identify the mobile device as being at a position 31 degrees from the controller. By knowing the height of the controller, the coordinate in a Cartesian coordinate system of the mobile device can be determined. At step 660, the controller process changes the distance of the sweep from the controller by slightly increasing the angle of elevation of the sweep (e.g., laser, etc.) from controller, for example by moving the angle by a tenth of a degree (see FIGS. 3A and 3B).

The controller process determines whether to keep changing angle of elevation as the angle of elevation is increased until the sweep is above all of the mobile devices and no longer in a line-of-sight with any mobile devices (decision 670). If the angle of elevation needs to keep increasing, then decision 670 branches to the 'yes' branch which loops back to step 630 to sweep the area and further increase the angle of elevation. This looping continues until the angle of elevation no longer needs to be increased, at which point decision 670 branches to the 'no' branch exiting the loop. FIG. 6 controller processing thereafter returns to the calling routine (see FIG. 5) at 695.

FIG. 7 is a flowchart depicting steps taken during a radial sweep of an area.

FIG. 7 processing commences at 700 and shows the steps taken by a process that sweeps radially for mobile device relative elevations from the controller. By sweeping radially, this routine identifies a radial, or polar, coordinate of the mobile device with respect to the controller. At step 710, the process initializes the radial sweep using a sweep mechanism detectable by the mobile devices, such as a laser, etc. The starting position is established at an initial direction from the controller with this initial position being zero degrees from the controller. At step 720, as also explained in FIG. 5, the controller process pulses a timing start signal and also initializes a timer in the controller. A single timing signal can be used as the starting point of all sweeps or separate timing signals can be used.

At step 730, the controller process sweeps radially across the area of interest, such as an arena or stadium, to provide a radian position detection between the mobile devices and the controller. At step 740, the controller process retains timer time and current angle in table 750. This table is repeatedly updated so that an angle can be determined by searching the table for the elapsed time data that is provided back to the controller from a mobile device. For example, if a mobile device reports back that it received the sweep signal after two seconds, the controller would search table 750 for the angle corresponding to this time measurement, such as 64.5 degrees, so the controller would identify the mobile device as being at a position 64.5 degrees from the controller. By knowing the radial angle of the mobile device from the controller, the coordinate in a radial, or polar, coordinate system of the mobile device can be determined. At step 760, the controller process changes the angle of the sweep in a counter-clockwise direction from the controller by slightly changing the angle of the sweep (e.g., laser, etc.) from controller, for example by moving the angle by a tenth of a degree (see FIG. 4).

The controller process determines whether to keep changing the angle of the sweep around the area as the angle is repeatedly increased until either the sweep has completed a full circle (360 degrees) or all of the mobile devices have received a sweep signal (decision 770). If the sweep is not finished and the angle needs to keep increasing, then decision 770 branches to the 'yes' branch which loops back to step 730 to continue to sweep the area and further increase the angle of the sweep in a radial direction. This looping continues until the radial sweep is finished, at which point decision 770 branches to the 'no' branch exiting the loop. FIG. 7 controller processing thereafter returns to the calling routine (see FIG. 5) at 795.

FIG. 8 is a flowchart depicting steps taken to compute visual display patterns for area-wide visual effects and communicate display data to handheld devices. FIG. 8 processing commences at 800 and shows the steps taken by a process that computes visual display patterns for performing area-wide visual effects and communicates the display data to the mobile devices. At step 810, the process converts the devices' first elapsed time (Time 1) to angles from controller (with zero degrees pointing down) and then converts the angles to distances from controller, or to coordinates from the controller in a Cartesian coordinate system. The data received from the mobile devices is stored in table 805 that includes an identifier of each mobile device, a first elapsed time received from each mobile device, and a second elapsed time received from each mobile device. In addition, table 805 includes a field to store the distance, or Cartesian coordinate, of the mobile device in relation to the controller and another field for storing the polar coordinate of the mobile device in relation to the controller. The angle timings for the horizontal sweep are retrieved from memory area 650 with these angle timings being generated and stored by the process shown in FIG. 6. The Cartesian coordinate is stored in the distance field in table 805.

At step 815, the process converts the devices' second elapsed time (Time 2) to radial position from controller (in radians). The second elapsed time is retrieved from table 805 and the resulting radial position in a polar coordinate system is stored in the radian field of table 805. The radian timings are retrieved from memory area 750 with these radian timings being generated and stored by the process shown in FIG. 6.

At step 820, the process maps the mobile devices to the area of interest, such as a stadium or arena, based on the Cartesian and polar coordinate data stored in the distance and radians field for each mobile device in table 805. An example of a resulting map is depicted as map 825 with each of the blocks representing one of the mobile devices.

At step 830, the process selects the first image to display and this image is overlaid onto map 825 in order to determine what portion of the image should be displayed on the individual mobile devices. For example, one mobile device might display a solid blue on its screen while another device might display a solid red, and another device a solid white. This image data, such as a picture, logo, or the like, is retrieved from memory area 835. At step 840, the process sets amount of time to display selected image, unless the image display time is a constant time (e.g., one second), in which this step can be skipped. At step 845, the process writes the display instructions for each device based on the individual mobile device's position juxtaposed with the image overlay. Memory area 850 depicts device display data for all of the mobile devices that are being used to display data. Individual memory areas, 855, 860, 865, and 870, are used to store display data for different individual mobile devices, Dev1, Dev2, Dev3, and DevN, respectively. The image that the device is to display is stored in the display data memory area along with optional display times. In the example shown, each device has a number of different display data entries so, when played, will appear as a moving image on the collective of mobile devices.

The process determines as to whether there are more images being displayed, such as to display an image that appears to move when displayed on the collective of mobile devices (decision 875). If there are more images being displayed, then decision 875 branches to the 'yes' branch which loops back to stop 830 to select and process the next image from memory area 835. This looping continues until there are no more images to process, at which point decision 875 branches to the 'no' branch exiting the loop. At step 880, the process transmits the display instructions stored in memory area 850 to the respective mobile devices (e.g., mobile device Dev1 receiving data from memory area 855, mobile device Dev2 receiving data from memory area 860, etc.). FIG. 8 processing thereafter returns to the calling routine (see FIG. 5) at 895.

Figure 9:
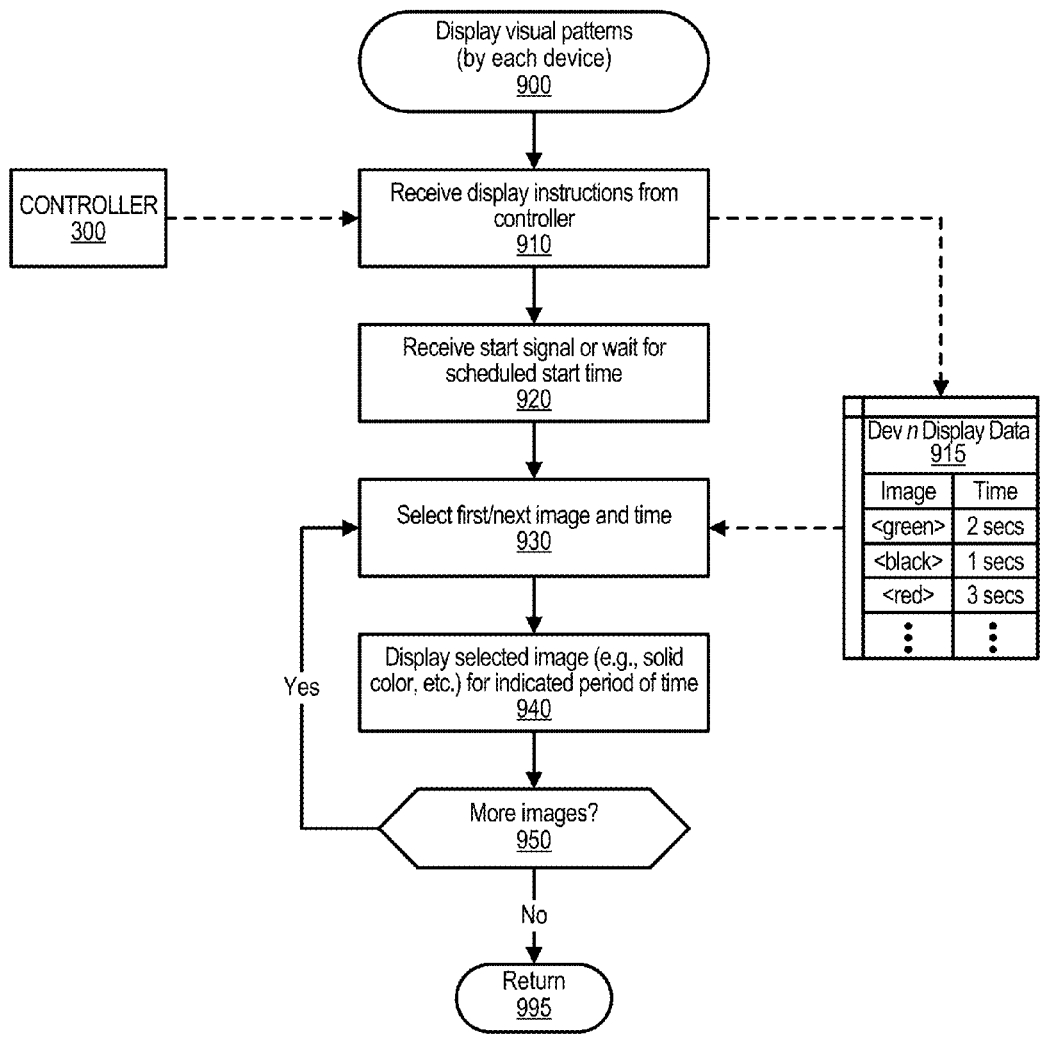
FIG. 9 is a flowchart depicting steps taken by each devices to display visual patterns at the handheld device.

FIG. 9 is a flowchart depicting steps taken by each devices to display visual patterns at the handheld device. FIG. 9 processing commences at 900 and shows the steps taken by a process that displays visual patterns at the mobile devices. This routine is performed by each of the mobile devices using the display instructions generated for the mobile device as shown in FIG. 8. In FIG. 9, step 910, the mobile device process receives the display instructions from controller 300 and stores the display instructions in memory area 915 in the mobile device. At step 920, the mobile device process receives a start signal or waits for a scheduled start time when the visual display event is to commence.

When the display commences, at step 930, the mobile device process selects the first image and time from memory area 915. At step 940, the mobile device process displays the selected image (e.g., solid color, etc.) for the indicated period of time on the mobile device display screen. The mobile device process determines as to whether there are more images to select and display (decision 950). If there are more images to process, then decision 950 branches to the 'yes' branch which loops back to step 930 to select and process the next image from memory area 915 as described above. This looping continues until there are no more images to process, at which point decision 950 branches to the 'no' branch exiting the loop. FIG. 9 mobile device processing thereafter returns to the calling routine (see FIG. 5) at 995.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
transmitting a timing signal to a plurality of mobile devices, wherein the timing signal is transmitted substantially simultaneously to the plurality of mobile devices;
emitting a plurality of line-of-sight sweeps across an area where the mobile devices are located, wherein each of the line-of-sight sweeps are directed using a different angular motion;
receiving, from the plurality of mobile devices, a plurality of timing data, wherein each of the timing data is based on an elapsed time from the timing signal and the plurality of line-of-sight sweeps;
identifying a location of each of the plurality of mobile devices based on the respective timing data received from each of the mobile devices;
determining a portion of an overall image to display at each of the mobile devices based on the identified location of the mobile devices; and
displaying the overall image by transmitting the determined portion to each of the plurality of mobile devices.

2. The method of claim 1 wherein a first of the plurality of line-of-sight sweeps is a horizontal sweep from a controller that is used to identify a first coordinate value corresponding to each of the plurality of devices, wherein a second of the plurality of line-of-sight sweeps is a radial sweep from the controller that is used to identify a radian coordinate value from the controller to each of the plurality of devices, and wherein the location of each of the plurality of devices is based on the first coordinate value and the radian coordinate.

3. The method of claim 1 further comprising:
recording a time period between the transmission of the timing signal and a plurality of angles that comprise the angular motions traversed during the plurality of line-of-sight sweeps, wherein the location of each of the plurality of mobile devices is determined based on the angles that correspond to the recorded time periods that match the received timing data received from the plurality of mobile devices.

4. The method of claim 1 further comprising:
mapping the locations of the plurality of mobile devices onto the area; and
overlaying the overall image onto the area, wherein the portion of the overall image to display at each of the mobile devices is derived from the overlaid image with respect to the location of each of the plurality of mobile devices.

5. The method of claim 1 further comprising:
transmitting a plurality of portions, including the portion, to each of the plurality of mobile devices, wherein each of the plurality of portions corresponds to one of a plurality of overall images so that when the plurality of portions are successively displayed on the plurality of mobile device a motion-based image appears.

6. The method of claim 5 further comprising:
transmitting one or more time periods to each of the plurality of mobile devices, wherein each of the time periods corresponds to an amount of time that one or more of the transmitted plurality of portions is to be displayed.

7. An information handling system comprising:
one or more processors;
a timing signal generator that is accessible by at least one of the processors to transmit a timing signal;
one or more line-of-sight transmitters that each transmit a detectable line-of-sight transmission;

a memory coupled to at least one of the processors; and
a set of instructions stored in the memory and executed by at least one of the processors to perform actions comprising:
transmitting a timing signal to a plurality of mobile devices, wherein the timing signal is transmitted substantially simultaneously to the plurality of mobile devices;
emitting a plurality of line-of-sight sweeps across an area where the mobile devices are located, wherein each of the line-of-sight sweeps are directed using a different angular motion;
receiving, from the plurality of mobile devices, a plurality of timing data, wherein each of the timing data is based on an elapsed time from the timing signal and the plurality of line-of-sight sweeps;
identifying a location of each of the plurality of mobile devices based on the respective timing data received from each of the mobile devices;
determining a portion of an overall image to display at each of the mobile devices based on the identified location of the mobile devices; and
displaying the overall image by transmitting the determined portion to each of the plurality of mobile devices.

8. The information handling system of claim 7 wherein a first of the plurality of line-of-sight sweeps is a horizontal sweep from a controller that is used to identify a first coordinate value corresponding to each of the plurality of devices, wherein a second of the plurality of line-of-sight sweeps is a radial sweep from the controller that is used to identify a radian coordinate value from the controller to each of the plurality of devices, and wherein the location of each of the plurality of devices is based on the first coordinate value and the radian coordinate.

9. The information handling system of claim 7 wherein the actions further comprise:
recording a time period between the transmission of the timing signal and a plurality of angles that comprise the angular motions traversed during the plurality of line-of-sight sweeps, wherein the location of each of the plurality of mobile devices is determined based on the angles that correspond to the recorded time periods that match the received timing data received from the plurality of mobile devices.

10. The information handling system of claim 7 wherein the actions further comprise:
mapping the locations of the plurality of mobile devices onto the area; and
overlaying the overall image onto the area, wherein the portion of the overall image to display at each of the mobile devices is derived from the overlaid image with respect to the location of each of the plurality of mobile devices.

11. The information handling system of claim 7 wherein the actions further comprise:
transmitting a plurality of portions, including the portion, to each of the plurality of mobile devices, wherein each of the plurality of portions corresponds to one of a plurality of overall images so that when the plurality of portions are successively displayed on the plurality of mobile device a motion-based image appears.

12. The information handling system of claim 11 wherein the actions further comprise:
transmitting one or more time periods to each of the plurality of mobile devices, wherein each of the time periods corresponds to an amount of time that one or more of the transmitted plurality of portions is to be displayed.

13. A computer program product comprising:
a computer readable storage medium comprising a set of computer instructions, the computer instructions effective to perform actions comprising:
transmitting a timing signal to a plurality of mobile devices, wherein the timing signal is transmitted substantially simultaneously to the plurality of mobile devices;
emitting a plurality of line-of-sight sweeps across an area where the mobile devices are located, wherein each of the line-of-sight sweeps are directed using a different angular motion;
receiving, from the plurality of mobile devices, a plurality of timing data, wherein each of the timing data is based on an elapsed time from the timing signal and the plurality of line-of-sight sweeps;
identifying a location of each of the plurality of mobile devices based on the respective timing data received from each of the mobile devices;
determining a portion of an overall image to display at each of the mobile devices based on the identified location of the mobile devices; and
displaying the overall image by transmitting the determined portion to each of the plurality of mobile devices.

14. The computer program product of claim 13 wherein a first of the plurality of line-of-sight sweeps is a horizontal sweep from a controller that is used to identify a first coordinate value corresponding to each of the plurality of devices, wherein a second of the plurality of line-of-sight sweeps is a radial sweep from the controller that is used to identify a radian coordinate value from the controller to each of the plurality of devices, and wherein the location of each of the plurality of devices is based on the first coordinate value and the radian coordinate.

15. The computer program product of claim 13 wherein the actions further comprise:
recording a time period between the transmission of the timing signal and a plurality of angles that comprise the angular motions traversed during the plurality of line-of-sight sweeps, wherein the location of each of the plurality of mobile devices is determined based on the angles that correspond to the recorded time periods that match the received timing data received from the plurality of mobile devices.

16. The computer program product of claim 13 wherein the actions further comprise:
mapping the locations of the plurality of mobile devices onto the area; and
overlaying the overall image onto the area, wherein the portion of the overall image to display at each of the mobile devices is derived from the overlaid image with respect to the location of each of the plurality of mobile devices.

17. The computer program product of claim 13 wherein the actions further comprise:
transmitting a plurality of portions, including the portion, to each of the plurality of mobile devices, wherein each of the plurality of portions corresponds to one of a plurality of overall images so that when the plurality of portions are successively displayed on the plurality of mobile device a motion-based image appears.

* * * * *